Patented May 29, 1951

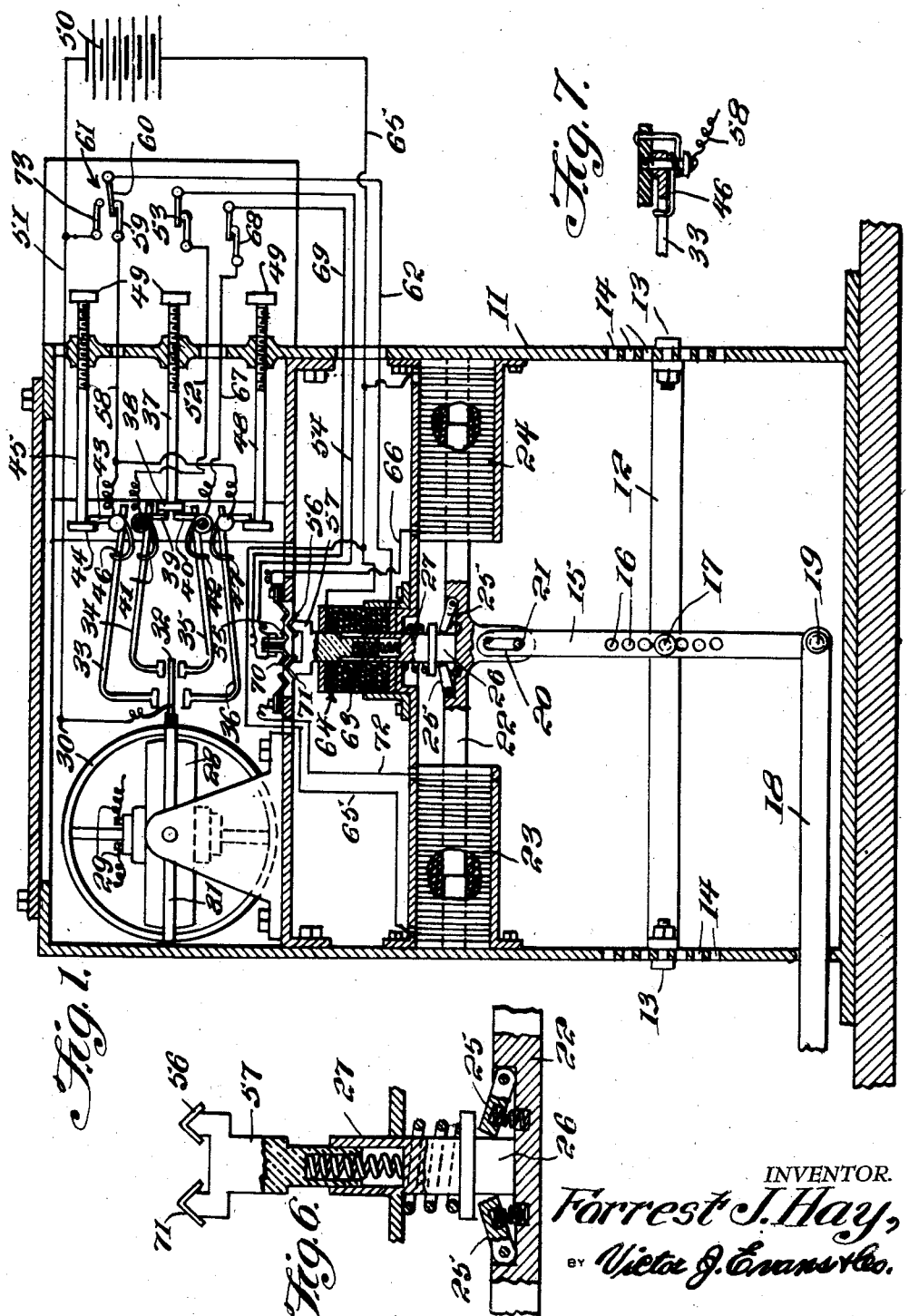

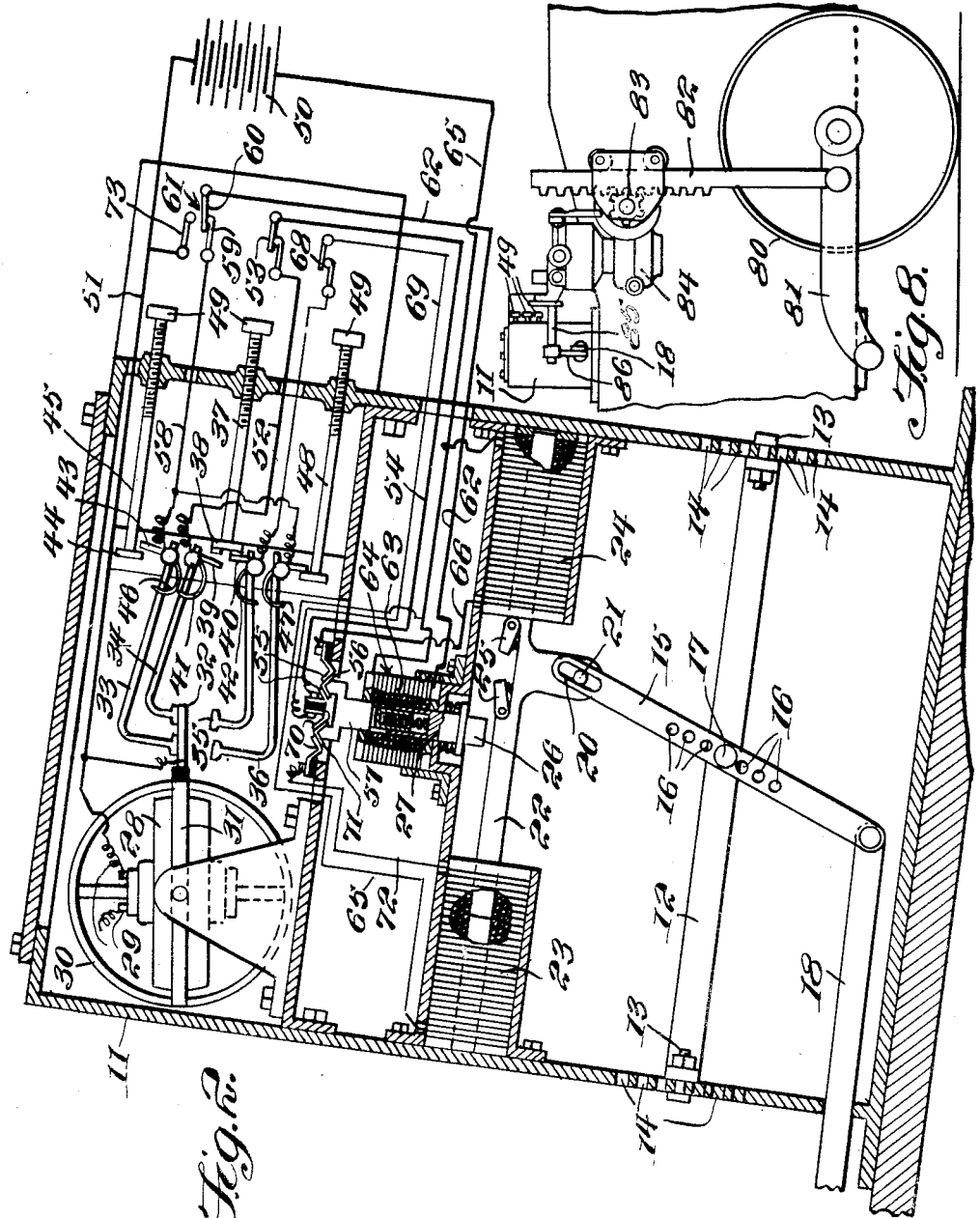

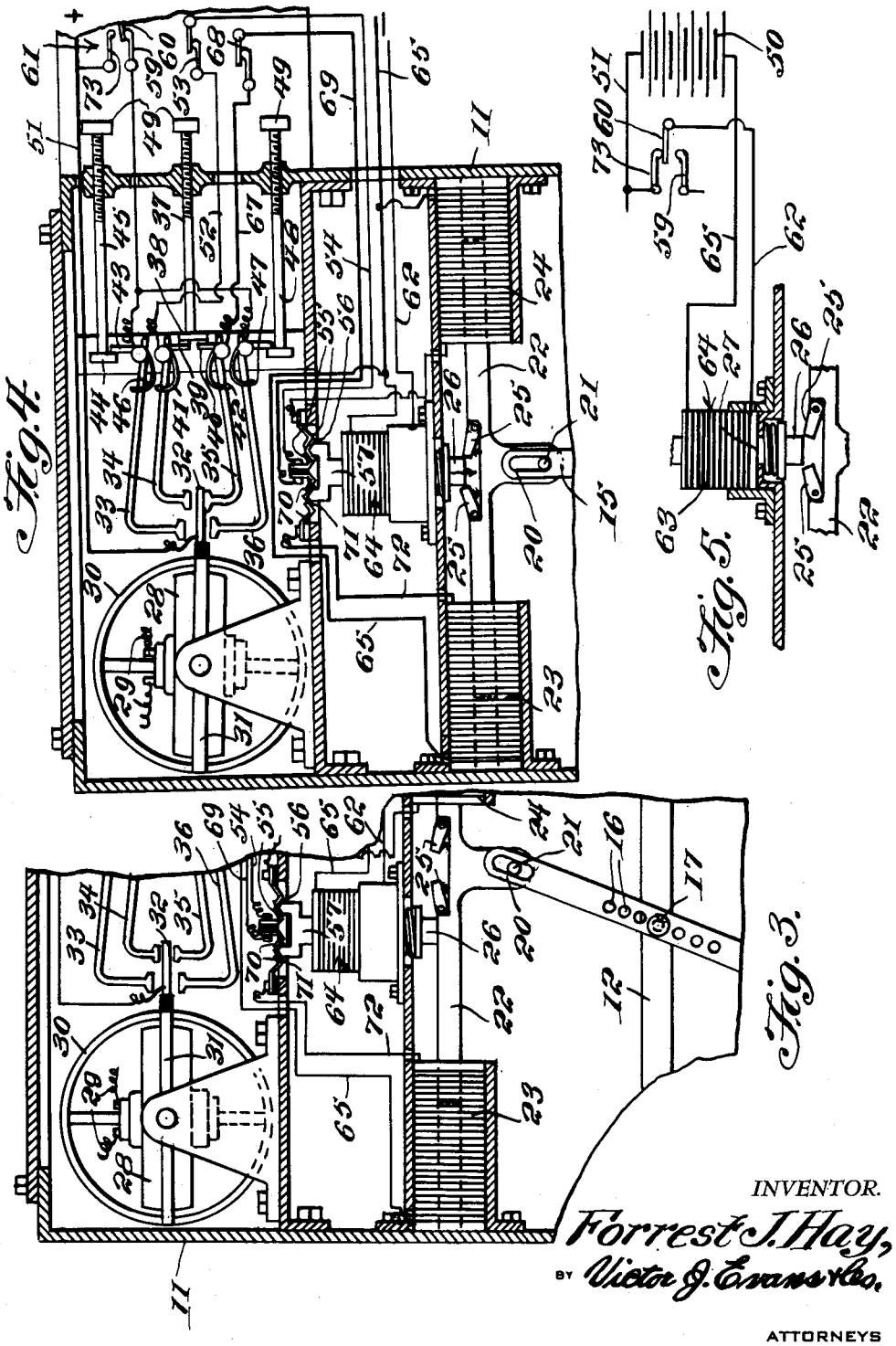

2,555,034

UNITED STATES PATENT OFFICE 2,555,034

AUTOMATIC LEVELER FOR HARVESTERS

Forrest J. Hay, The Dalles, Oreg.

Application June 8, 1948, Serial No. 31,811

1 Claim. (Cl. 175—335)

The present invention relates to leveling controls and more particularly to control of this character suitable for use in controlling the leveling device commonly provided on harvesters for hillside use.

An object of the invention is to provide a leveling control which will avoid the need for manual control of the leveling device of a hillside harvester.

A further object of the invention is to provide a device of this character which will respond to angular changes in position of the harvester only in the plane in which the leveling device of the harvester is arranged to operate. Angular variations in the attitude of the harvester in other planes will not affect the operation of the leveling control. In the present instance, the embodiment of the invention illustrated in the following specification is responsive only to angular displacements accompanying changes in lateral position of the harvester thereby keeping it level as it proceeds along a hillside.

Another object of the invention is to provide a device which will actuate the leveling control without attention from the operator of the harvester thus keeping the harvester level notwithstanding variations in the slope of the hillside, and thereby permitting the operator of the harvester to devote his entire attention to phases of operation of the machine not related to the leveling device.

Other and further objects will become apparent upon reading the following specification together with the accompanying drawing forming a part hereof.

Referring to the drawing:

Fig. 1 is a sectional view in elevation of an embodiment of the invention.

Fig. 2 is a view similar to Fig. 1, showing the device in a tilted position.

Fig. 3 is a fragmentary view showing the device after it has been restored to the level position.

Fig. 4 shows the device at the termination of corrective action.

Fig. 5 is a fragmentary view showing the action of a locking solenoid during manual control.

Fig. 6 is an enlarged fragmentary sectional view showing the construction of the plunger of the locking solenoid.

Fig. 7 is an enlarged fragmentary sectional plan view showing the pivotal mounting arrangement of a contact finger.

Fig. 8 is a reduced fragmentary view showing a portion of a harvester with the invention applied thereto.

Referring to Fig. 1, a housing designated generally as 11 supports a transverse bar 12 which may be secured by bolts 13 in any pair of a series of vertically spaced holes 14. A vertically disposed lever 15 is provided with a corresponding group of vertically spaced holes 16 any one of which may be engaged by pivot pin 17 depending upon the position of bar 12.

At its lower end, lever 15 is pivotally connected to a horizontally extending actuating member 18 by a pin 19. By appropriate selection of the pair of holes 14 for bar 12 and the corresponding hole 16 in lever 15 for pin 17, the amount of travel of actuating member 18 for a particular angular displacement of lever 15 may be regulated. In this way, the correct amount of travel of actuating member 18 may be obtained to secure proper operation of the leveling mechanism of a particular harvester. The amount of travel may be different for harvesters of different manufacturers and different models of the same manufacturer.

At its upper end, lever 15 is provided with a slotted forked portion 20 which slidingly engages a pin 21 carried by a transversely movable double acting solenoid plunger 22 which extends to oppositely disposed solenoid windings 23 and 24. A pair of spring loaded dogs 25 engage opposite sides of the engaging bottom portion 26 of a solenoid plunger designated generally as 27. Dogs 25 hold plunger 22 centrally positioned and permit its return to the central position while the lower portion 26 of plunger 27 is exerting a downward pressure.

The stabilizing element which detects changes in angular position of the harvester is shown by way of illustration as a gyroscope 28 which may be electrically energized as by conductors 29 which extend to a suitable source of power. Gyroscope 28 is shown mounted in the usual gimbal rings 30 and 31. Extending diametrically outwardly from gimbal ring 31 is a contact finger 32 which is adapted for engagement with contact fingers 33 to 36. The spacing between contact fingers 34 and 35 is adjustable by means of a screw 37 which is provided at one end with an enlarged flat portion 38 which engages arms 39 and 40 of contact fingers 34 and 35 respectively. Arms 39 and 40 are held in yielding engagement with shoulder portion 38 of screw 37 by springs 41 and 42 respectively. Similarly, arm 43 of contact finger 33 is held in yielding engagement with shouldered portion 44 of adjusting screw 45 by spring 46. Spring 47 has a similar action with respect to contact finger 36 and its associated adjusting screw 48. Each of the adjusting screws 37, 45 and 48 is provided with a knob 49 at the exterior of housing 11.

In operation, assume that the harvester tilts so that housing 11 assumes the position shown in Fig. 2. At first, movable contact 32 will engage contact finger 34 establishing a circuit from battery 50 via conductor 51, movable contact 32, finger 34, conductor 52, closed contacts of switch 53, and conductor 54 to contacts 55 where the circuit is open awaiting engagement with movable contact member 56 carried by insulating block 57 of solenoid plunger 27.

Movable contact member 32 next engages contact finger 33 establishing a circuit via conductor 58, contacts 59 and 60 of switch 61, and conductor 62 to one side of winding 63 of solenoid 64. The other side of winding 63 is connected directly via conductor 65 to the other side of battery 50. This causes energization of solenoid 64 drawing its plunger 27 upwardly. This upward movement brings contact member 56 into engagement with fixed contacts 55 and completes the circuit previously described via conductor 66 to energize solenoid 24, drawing plunger 22 to the right, as shown in Fig. 2. The resulting movement of actuating member 18 causes corrective action of the leveling device of the harvester.

As a result of the restorative movement produced by the leveling device, movable contact member 32 disengages contact fingers 33 and 34 opening the circuits previously established. Armature 22, however, does not return to its central position because no restoring spring is provided for this purpose, and the actuating member 18 therefore causes the corrective movement to continue until movable contact 32 engages contact finger 35.

Upon engagement with contact finger 35, a circuit is established from battery 50 through finger 35, conductor 67, closed contacts of switch 68, conductor 69, through closed contacts 70 which are engaged by movable contact member 71 since plunger 27 is held mechanically supported in its upward position by plunger 22, and thence through conductor 72 to one side of solenoid 23. Solenoid 23 has its other side connected to the other side of battery 50 by conductor 65 and it becomes energized drawing plunger 22 to the left. The lower portion 26 of plunger 27 rides over dog 25 and drops, causing disengagement of contacts 70 and movable contact member 71, thereby opening the circuit to solenoid 23.

The operation of the contact fingers and solenoids in response to tilting in the opposite direction will be obvious, inasmuch as the device is generally symmetrical in its arrangement.

It will be noted that no corrective action of the leveling device will be caused until movable contact member 32 engages two contact fingers such as 33 and 34, or 35 and 36. When the corrective action of the leveling device has continued to a point where it causes a circuit to be established with one of the central contact fingers 34 or 35, one of the solenoids 23 or 24 will be energized, and energization of the proper solenoid will cause plunger 22 to re-assume its central position. The amount of angular displacement required to initiate corrective action of the leveling device may be adjusted by appropriate manipulation of knobs 49 associated with adjusting screws 45, 37 and 48.

By throwing switch 61 so that contacts 60 and 73 are closed, solenoid 64 may be permanently energized raising the lower portion 26 of its plunger 27 clear of spring loaded dogs 25, thus permitting free lateral movement of plunger 22. This should also be accompanied by an opening of switches 53 and 68, so that the leveling device may then actuate manually and independently of the automatic control.

Fig. 8 shows the device attached to a harvester of conventional construction. Wheel 80 which is secured to arm 81 may effectively be raised or lowered by movement of rack 82 which may be caused by rotation of pinion 83 which is in engagement therewith. Pinion 83 is controllably driven from a power take off on the harvester through a gear box 84, the control being provided through shifter shaft 85. Shifter shaft 85 is connected through an arm 86 which is connected to the end of actuating member 18 which protruded from housing 11.

While various changes may be made in the detail construction, it shall be understood that such changes shall be within the spirit and scope of the present invention as defined by the appended claim.

I claim:

A leveling control for farm implements having a pivotally mounted section, comprising a gyroscope having a switch arm responsive to the tilting of the section when the implement upon which the gyroscope is mounted is tilted, a first set of contacts positioned for engagement by said switch arm, leveling means for the implement, a pair of solenoids having a common plunger for operating the leveling means, said solenoids controlled by said first set of contacts, said plunger comprising a latch mechanism for maintaining the plunger in a neutral position between the solenoids, a latch operating solenoid for operating said latch mechanism, a second set of contacts positioned adjacent said first set of contacts for engagement by the switch arm of said gyroscope, said latch operating solenoid being controlled by said second set of contacts, a third set of contacts mounted for operation by said latch mechanism, and being connected in series respectively with said solenoids and said first set of contacts, means for adjusting said first and second set of contacts, and means for adjusting said leveling means.

FORREST J. HAY.

REFERENCES CITED

The following references are of record in the file of this patent:

UNITED STATES PATENTS

| Number | Name | Date |
| --- | --- | --- |
| 999,012 | Danziger | July 25, 1911 |
| 1,015,837 | Regnard | Jan. 30, 1912 |
| 1,224,657 | Miller | May 1, 1917 |
| 1,507,504 | Morgan | Sept. 2, 1924 |
| 1,663,539 | Bellinger | Mar. 27, 1928 |
| 1,885,414 | Chessin | Nov. 1, 1932 |
| 2,208,948 | Rahrer | July 23, 1940 |